(12) United States Patent
Jung et al.

(10) Patent No.: US 6,301,248 B1
(45) Date of Patent: Oct. 9, 2001

(54) TRANSPORT STREAM MULTIPLEXING APPARATUS CAPABLE OF ACCOMMODATING PLURALITY OF STREAMS

(75) Inventors: Dong Bun Jung, Dejon-Shi; Yeong Weon Hwang, Daejon-Shi; Kang Il Choi, Daejon-Shi; Jun Kyun Choi, Daejon-Shi, all of (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/112,711

(22) Filed: Jul. 9, 1998

(30) Foreign Application Priority Data

Jul. 10, 1997 (KR) ................................. 97-32145

(51) Int. Cl.[7] ............................. H04L 12/28; H04L 12/56
(52) U.S. Cl. ............................................................ 370/392
(58) Field of Search ................................... 370/392, 359, 370/389, 394, 412, 413, 415, 417, 419, 423, 465, 474, 537, 538, 539, 541, 395, 345, 396, 532, 540, 904

(56) References Cited

U.S. PATENT DOCUMENTS

| | | | |
|---|---|---|---|
| 5,856,973 | * 1/1999 | Thompson | 370/389 |
| 6,118,786 | * 9/2000 | Tiernan et al. | 370/416 |
| 6,157,674 | * 12/2000 | Oda et al. | 375/240 |

OTHER PUBLICATIONS

Paul W. Lyons, "Grand Alliance Prototype Transport Stream Encoder Design and Implementation", Aug. 19, 1995, pp. 760–772.

* cited by examiner

Primary Examiner—Dang Ton
Assistant Examiner—Phirin Sam
(74) Attorney, Agent, or Firm—Cohen, Pontani, Lieberman & Pavane

(57) ABSTRACT

This invention is directed to a TS(Transport Stream) multiplexing apparatus capable of accommodating plurality of PES(Packetized Elementary Stream). The present invention provides a transport stream multiplexing apparatus which is capable of multiplexing in only one transport stream multiplexing apparatus plurality of PES streams transmitted from the respective encoders by simplifying an interface between the encoders and the transport stream multiplexing apparatus by means of a PCI bus. A transport stream multiplexing apparatus of the present invention comprises a PCI interface processor for transmitting distinctly plurality of stream transmitted through a PCI bus; control signal processor for outputting a selection signal, an input signal and a transmission control signal; media buffer for outputing a transport stream packet and a transport stream payload; timing processor for outputting a timing signal required for outputting a packet; multiplexing controller for outputting a transport stream header output signal; header processing means for outputting header data in response to the transport stream header output signal; and multiplexor for multiplexing the transport stream packet and the transport stream payload input from the media buffer and outputting the transport stream packet.

5 Claims, 5 Drawing Sheets

TRANSPORT STREAM MULTIPLEXING APPARATUS CAPABLE OF ACCOMMODATING PLURALITY OF STREAMS

BACKGROUND OF THE INVENTION

1. Field of the Invention:

This invention relates to a TS(Transport Stream) multiplexing apparatus, and more particularly, to a TS multiplexing apparatus capable of accommodating a plurality of PES(Packetized Elementary Stream) on the basis of PCI (Peripheral Compliant Interface) in which, when PES signals in MPEG(Moving Picture Expert Group)-2 video/audio system are processed in real time as one unit, plurality of MPEG-2 video/audio PES stream transmitted via a PCI bus are processed by only one TS multiplexing apparatus, and then matched with ATM network.

2. Description of the Related Art:

Conventionally, when programs are generated with PMT (Program Map Table), PAT (Program Association Table), PCR(Program Clock Reference), video packet, audio packet, etc. as the object of multimedia, plurality of PES streams transmitted from the respective encoders should be processed by the corresponding number of TS multiplexing apparatus, resulting in the need of a number of TS multiplexing apparatus. For example, as a TS multiplexing apparatus with 5 input terminals is required for one channel, plurality of TS multiplexing apparatus for accommodating per channel is needed for many channels. This leads to the inefficient use of the TS multiplexing apparatus.

SUMMARY OF THE INVENTION

For the purpose of overcoming the problem described above, the object of the present invention is to provide a transport stream multiplexing apparatus that can multiplex plurality of PES stream, transmitted from the respective encoders by means of one transport stream multiplexing apparatus by simplifying an interface between the encoders and the transport stream multiplexing apparatus by using a PCI bus.

In accordance with the aspects of the present invention, a transport stream multiplexing apparatus which transmits distinctly the data and controls the related signal input from the external; control signal processing that combines an address signal and a read/write signal inputted from that matching and outputs a selection signal, an input signal and a transmission control signal; buffering which the storing data inputted from the matching in response to the selection signal and the input signal inputted from the control signal process, outputs an output request signal, and outputting a transport stream packet and a transport stream payload in response to a payload output signal and a retransmission signal inputted according to the output request signal; timing process that the producing the timing signal required for outputting a packet in response to a reset signal and a clock signal inputted from the external, and outputs a program clock reference data; multiplexing control, that for processing according to an output scheduling the output request signal inputted from the buffering and the timing signal imputted from the timing process to output the payload output signal and the retransmission signal to the buffering process, and outputs a transport stream header output signal; header processing, which outputs header data in response to the transport stream header output signal inputted from the multiplexing control after processing data inputted from the matching and data inputted from the timing processing in response to the transmission control signal inputted from the control signal processing; and multiplexing which multiplexes the header data inputted from the header processing and the transport stream packet and the transport stream payload inputted from the buffering and outputs the transport stream packet.

BRIEF DESCRIPTION OF THE DRAWINGS

The aforementioned aspects and other features of the invention will be explained in the following description, taken in conjunction with the accompanying drawings wherein.

Similar reference characters refer to similar parts in the several views of the drawings.

DETAILED DESCRIPTION OF THE PREFERRED EMBODIMENT

The preferred embodiment of the transport stream multiplexing apparatus according to the present invention will be discussed hereinafter in detail with reference to the accompanying drawings.

First, the general operation of the TS multiplexing apparatus for multiplexing the transport stream will be described as below.

When plurality of MPEG-2 PES streams with their service bit rates variable between 5 and 15 Mbps is transmitted via a PCI bus, these streams are processed by one TS multiplexing apparatus and then matched with an ATM network.

Also, video/audio streams transmitted to the TS multiplexing apparatus are a type of PES which is a TS payload. Here, the length of PES may be variable or fixed and is defined by a multiple of 184 bytes (18×N, N is integer). The process for the variable PES is disclosed in Korean Patent Application No. 96-58214.

Accordingly, the input of the video/audio PES into the TS multiplexing apparatus is performed by the unit of 184 byte. Header of 4 bytes is added to each of the video/audio PES to generate a video/audio TS of 188 bytes to be transmitted to an ATM matching unit. Also, a PCR packet is multiplexed by means of a timer provided in the TS multiplexing apparatus. PMT and PAT packets are processed by means of the timer provided in the TS multiplexing apparatus and transmitted to the ATM matching unit after table information is stored into a buffer through a local processor during initialization.

Generally, in order to receive a service of a fixed byte rate in a B-ISDN, an ATM cell of 53 octet of packet type is used, and a MPEG-2 TS is used in a communication environment to accommodate the MPEG video information. Accordingly, the TS is composed of a header of 4 bytes and a payload of 184 bytes to allow the communication through an interface with ATM network.

Though the TS is originally formed for an ATM adaptation layer 1(AAL1), it is recommended to be used as an AAL5 protocol at present.

Accordingly, in order to match the transmitted 188 byte TS in which the MPEG video/audio is multiplexed with the ATM, 8 byte AAL5 trailer is added to two successive TSs(188×2) to form 48 byte AAL5-PDU(Protocol Data Unit) such that 8 ATM cells are generated and transmitted to the ATM network.

The formation of the PDU in the AAL5 protocol is such that a PTI(Payload Type Indication) bit of the ATM header is set as zero in the beginning and middle portion through the PTI of the ATM header and set as 1 when the PTI includes the last trailer. The PTI bit is transmitted to a receiver stage and recovered therein.

Figure 1:
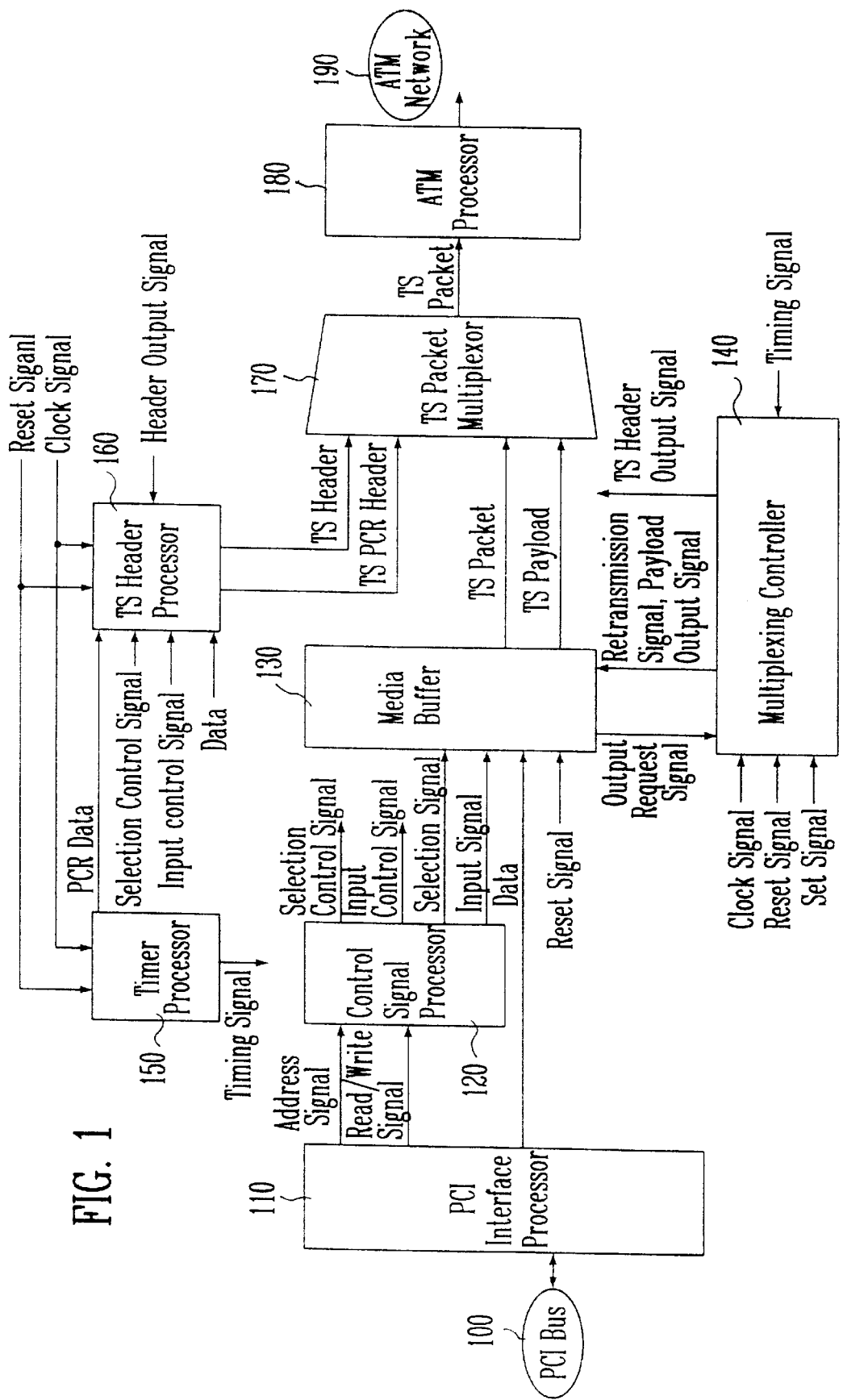
FIG. 1 illustrates a schematic block diagram of a transport stream multiplexing apparatus according to the present invention.

FIG. 1 shows a schematic block diagram of a transport stream multiplexing apparatus according to the invention. In the drawings, reference numeral 100 designates a PCI bus, 110 designates a PCI interface processor, 120 designates a control signal processor, 130 designates a media buffer, 140 designates a multiplexing controller, 150 designates a timer processor, 160 designates a TS header processor, 170 designates a TS packet multiplexor, 180 designates an ATM processor, and 190 designates an ATM network.

As the PCI bus 100 provides the transmission bandwidth having a hundreds of Mbps, an image service may be provided in real time by economically multiplexing a plurality of MPEG-2 stream by means of the PCI bus.

Here, length of the TS packet is fixed by 188 byte and composed of header of 4 byte and payload of 184 byte.

In order to recover the MPEG-2 video and audio information in the receiver, timing information for the recovery of the clock in a system layer as well as data information, which are stored in a PCR(Program Clock Reference) packet, must be transmitted at least one time within 0.1 sec. Also, PMT(Program Map Table) and PAT(Program Association Table) packets are appropriately multiplexed in the TS multiplexing apparatus and then transmitted to the ATM network in order to know further program information.

The TS multiplexing apparatus for accommodating plurality of PES streams on the PCI bus 100 receive system clock of 27 MHz and a reset signal to transmit all signals for multiplexing the TS packet to the respective processors.

The PCI interface processor 110 transmits an address signal ADDR and a read/write signal R/W to the control signal processor 120 and data to the media buffer 130 and the TS header processor 160 such that control-related signals and media data received from encoders on the PCI bus are processed distinctly.

The control signal processor 120 is composed of the combination of logic circuits, combines the address signal ADDR and the read/write signal R/W received from the PCI interface processor 110 to transmit a selection signal AV-CSn and an input signal AV-WRn to the media buffer 130, and transmits transmission control signals TS-CSn and TS-WRn to the TS header processor 160, respectively.

The media buffer 130 is composed of several buffers, stores media PES-related data transmitted from the PCI interface processor 110 respectively based on the selection signal AV-CSn and the input signal AV-WRn received from the control signal processor 120, and then transmits an output request signal AV-RQn from each buffer therein to the multiplexing controller 140. Responding to this, the media buffer 130 outputs TS packets TS-PMT and TS-PAT and a TS payload to the TS packet multiplexor 170 in response to a payload output signal AV-RDn and a retransmission signal PAT-RXT received from the multiplexing controller 140.

The multiplexor controller 140 receives the output request signal AV-RQn outputted from the media buffer 130 and the timing signal outputted from the timer processor 150 to transmit the payload output signal AV-RDn and the retransmission signal PAT-RXT to the media buffer 130 and a TS header output signal HD-RDn to the TS header processor 160.

The timer processor 150 receives the reset signal and the clock signal from the external and generates a timing signal TM-RQn required for outputting PCR, PAT and PMT packets to be transmitted to the multiplexing controller 140 and transmits PCT data for the PCR packet transmission to the TS header processor 160.

The TS header processor 160 receives the TS header-related data and control signal TS-CSn and TS-WRn from the PCI interface processor 110 and the control signal processor 120 respectively to set TS headers in order to process a plurality of TS header assigned and outputs the corresponding TS header to the TS packet multiplexing 170 in response to the TS header output signal HD-RDn received from the multiplexing controller 140. In addition, the TS header processor 160 receives PCR data from the timer processor 150 and outputs a TS PCR header to the TS packet multiplexor 170.

The TS packet multiplexor 170 is composed of a multiple stage of multiplexor and logic circuit, receives a TS header TS-HDn and a TS PCR header outputted from the TS header processor 160 and a TS packet TSPSIn(TS-PMT and TS-PAT) and a TS payload TS-PDn outputted from the media buffer 130 to multiplex for each media and produce a TS packet TS-PDU to be transmitted to the ATM processor 180.

The ATM processor 180 is disclosed in Korean Patent Application No. 95-55917.

Figure 2:
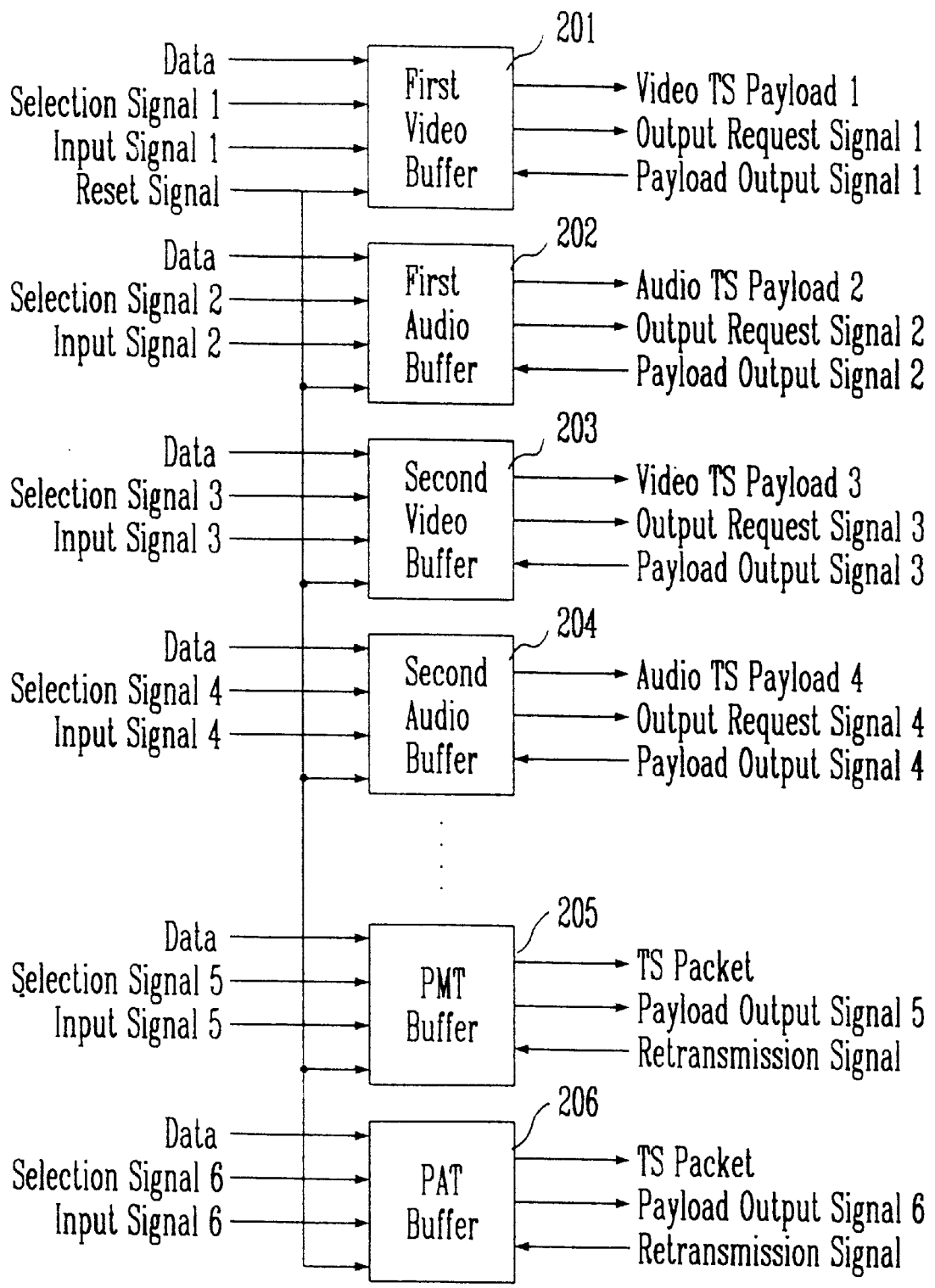
FIG. 2 illustrates a detailed configuration of a media buffer of FIG. 1.

FIG. 2 shows a detailed configuration of the media buffer of FIG. 1. In FIG. 2, reference numeral 201 designates a first video buffer, 202 designates a first audio buffer, 203 designates a second video buffer, 204 designates a second audio buffer, 205 designates a PMT buffer, and 206 designates a PAT buffer.

The first video buffer 201 stores data(video PES stream) transmitted from the PCI interface processor 110 in response to a selection signal AV-CS1 and an input signal AV-WR1 received from the control signal processor 120, transmits an output request signal AV-RQ1 to the multiplexing controller 140, and accordingly, outputs a video TS payload AV-PD1 stored therein in response to a payload output signal AV-RD1 received from the multiplexing controller 140. Here, the TS payload consists of 184 bytes.

The first audio buffer 202 stores data (audio PES stream) transmitted from the PCI interface processor 110 in response to another selection signal AV-CS2 and another input signal AV-WR2 received from the control signal processor 120, transmits another output request signal AV-RQ2 to the multiplexing controller 140, and, accordingly, outputs an audio TS payload AV-PD2 stored therein in response to another payload output signal AV-RD2 received from the multiplexing controller 140. Here, the TS payload consists of the 184 bytes like that of the first video buffer 201.

The second video buffer 203 operates similar to the first video buffer 201, and the second audio buffer 204 also operates similar to the first audio buffer 202.

Accordingly, additional video and audio buffers operate in a similar manner and can accommodate media stream up to ten. However, the PMT buffer 205 or the PAT buffer 206 to store the MPEF-2 program operates in a different manner from the media buffers.

In other words, the PMT buffer 205 is composed of a first-in first-out circuit FIFO, stores the TS packet PMT transmitted from the PCT interface processor 110, which consists of 188 bytes, in response to a selection signal AV-CS5 and an input signal AV-WR5 received from the control signal processor 120, determines a retransmission mode in response to the retransmission signal PMT-RTX received from the multiplexing controller 140, and transmits a TS-PMT packet to the TS packet multiplexor 170 in response to a payload output signal AV-RD5 received from the multiplexing controller 140.

The PAT buffer 206 operates in a manner similar to the PMT buffer 205. The PAT buffer 206 stores the TS packet PAT transmitted from the PCI interface processor 110, which consists of 188 bytes, response to another selection signal AV-CS6 and another input signal AV-WR6 received from the control signal processor 120, determines a retransmission mode in response a retransmission signal PAT-RTX received from the multiplexing controller 140, and transmits a TS-PAT packet to the TS packet multiplexor 170 in response to a payload output signal AV-RD6 received from the multiplexing controller 140.

Figure 3:
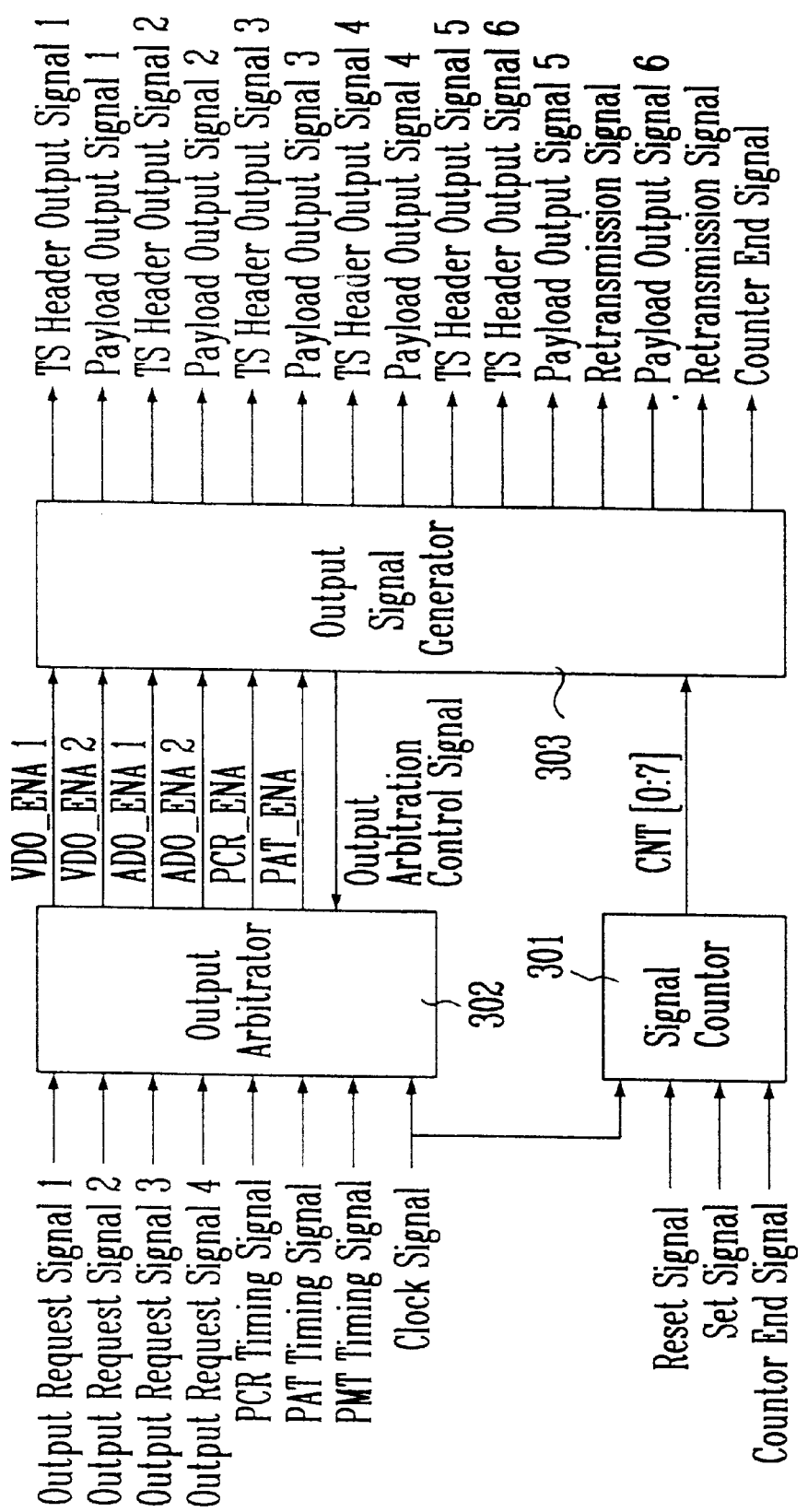
FIG. 3 illustrates a detailed configuration of a multiplexing controller of FIG. 1.

FIG. 3 shows a detailed configuration of the multiplexing controller of FIG. 1. In FIG. 3, reference numeral 301 designates a signal counter, 302 designates an output arbitrator, and 303 designates an output signal generator. The multiplexing controller receives a clock signal of 27 MHz and a rest signal inputted from the external to initialize and drive each circuit through the clock signal and a control signal.

At initialization state, the signal counter 301 composed of a logic circuit, a flip-flop, and 8 bit counter receives a set signal TX-SET, a reset signal, and the clock signal to begin the counting up of the internal, and then receives a counter end signal CNT-END outputted when a limited counter area is finished from the output signal generator 303 to control the operation of the output signal generator 303.

Here, an internal counter circuit composed of 8 bit counter operates in response to the clock signal of 27 MHz and the counter end signal CNT-END and transmits 8 bit counter value CNT[7:0] to the output signal generator 303 periodically.

The output arbitrator 302 composed of a register, a logic circuit and a state machine is initialized through the clock signal of 27 MHz and an output arbitration control signal ABT_ENA received from the output signal generator 303 and determines which TS packet to be outputted by output request signals AV_RQs (AV_RQ1, AV_RQ2, AV_RQ3, AV_RQ4, . . . ) and timing signals TM_RQs(PCR_RQ, PMT_RQ, RAT_RQ) received the media buffer 130 and the timer processor respectively when an output arbitration control signal ABT_ENA is valid. Also, the output arbitrator 302 transmits one of VDO_ENA1, VDO_ENA2, ADO_ENA2, PCR_ENA, PMT_ENA and PAT_ENA signal to the output signal generator 303 when a corresponding TS packet is outputted.

The output signal generator 303 receives 8 bit counter value from the signal counter 301 in response to the counter end signal transmitted to the signal counter 301, and receives a TS packet enable signal desired to be outputted in response to the output arbitration control signal transmitted to the output arbitrator 302 so that a corresponding packet is outputted to the TS packet multiplexor 170 and the retransmission signal is outputted to the media buffer 130.

Figure 4:
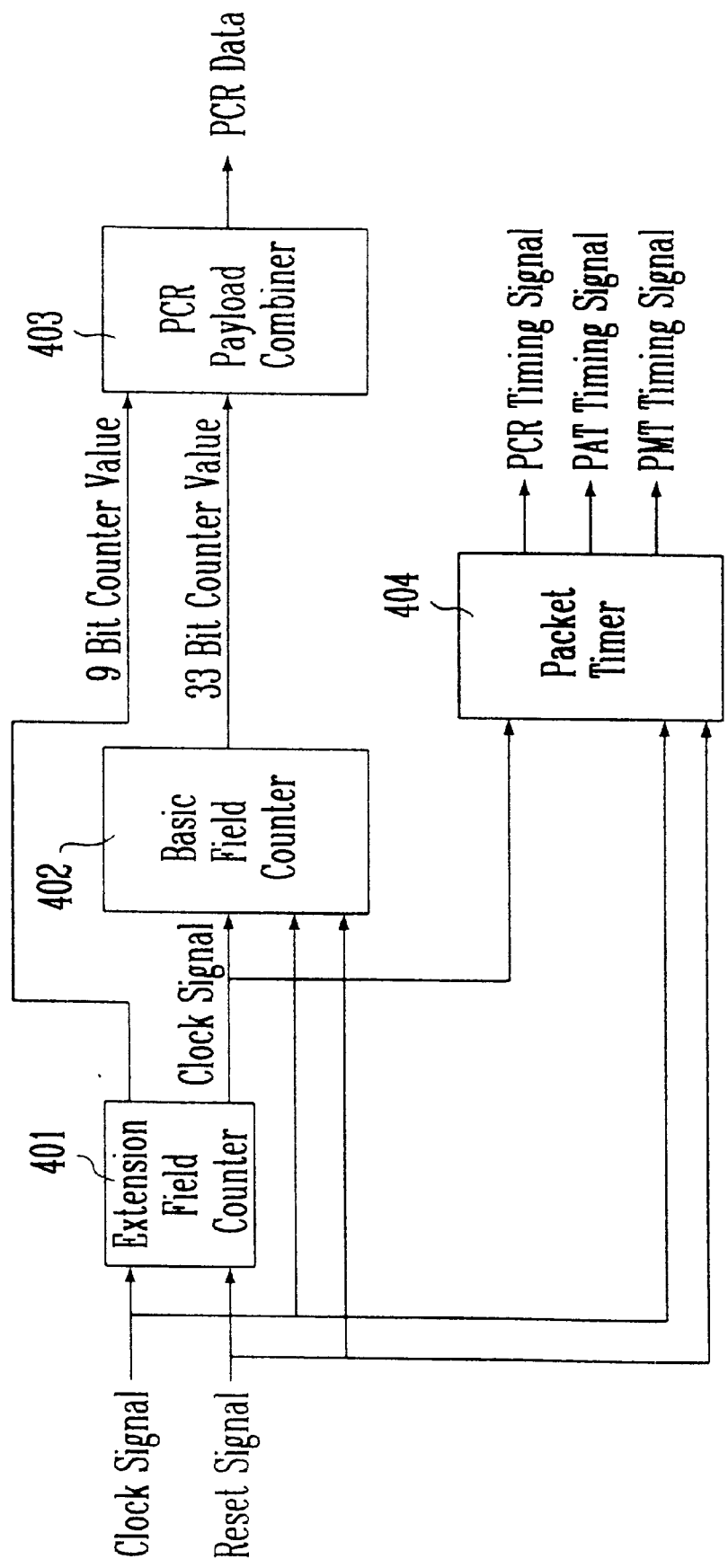
FIG. 4 illustrates a detailed configuration of a timer processor of FIG. 1.

FIG. 4 shows a detailed configuration of the timer processor of FIG. 1. In FIG. 4, reference 401 designates an extension field counter, 402 designates a basic field counter, 403 designates a PCR payload combiner, and 404 designates a packet timer.

The timer processor 150 operates through the clock signal of 27 MHz and the reset signal received from the external.

First, the extension field counter 401 composed of a 9 bit counter and a logic circuit transmits a clock signal of 90 KHz generated when the counter output becomes 300 to the basic field counter 402 and the packet timer 404 and transmits a 9 bit counter value PCR_EXT to the PCR payload combiner 403.

The basic field counter 402 composed of a 33 bit counter and a register transmits a 33 bit counter value PCR_BAS to the PCR payload combiner 403 by counting up in response to the clock signal of 90 KHz.

The PCR payload combiner 403 composed of a multiplexing unit and a register generates PCR data of 6 bytes a stepping bit between the bit counter value PCR_EXT and the 33 bit count value PCR_BAS and then transmits the PCR data to the TS header processor 160.

The packet timer 404 composed a multiple stage of counter must transmit the PCR packet at least one time within 0.1 sec when the PCR, PAT and PMT packet outputs are required. Accordingly, if a PCR timing signal PCR_RQ is transmitted to the multiplexing controller 140 when the timer reaches to 0.05 in order to transmit the PCR packet one time within 0.05 sec in consideration of a cell loss occurred in the ATM network, the PCR packet is transmitted with an order of the highest priority. Also, though the transmission periods for the PAT and PMT timing signal PMT_RQ and PAT timing signal PAT_RQ requesting outputs of TS_PMT and TS_PAT packets to the multiplexing controller 140 in sequence when the time reaches to 1 sec.

Figure 5:
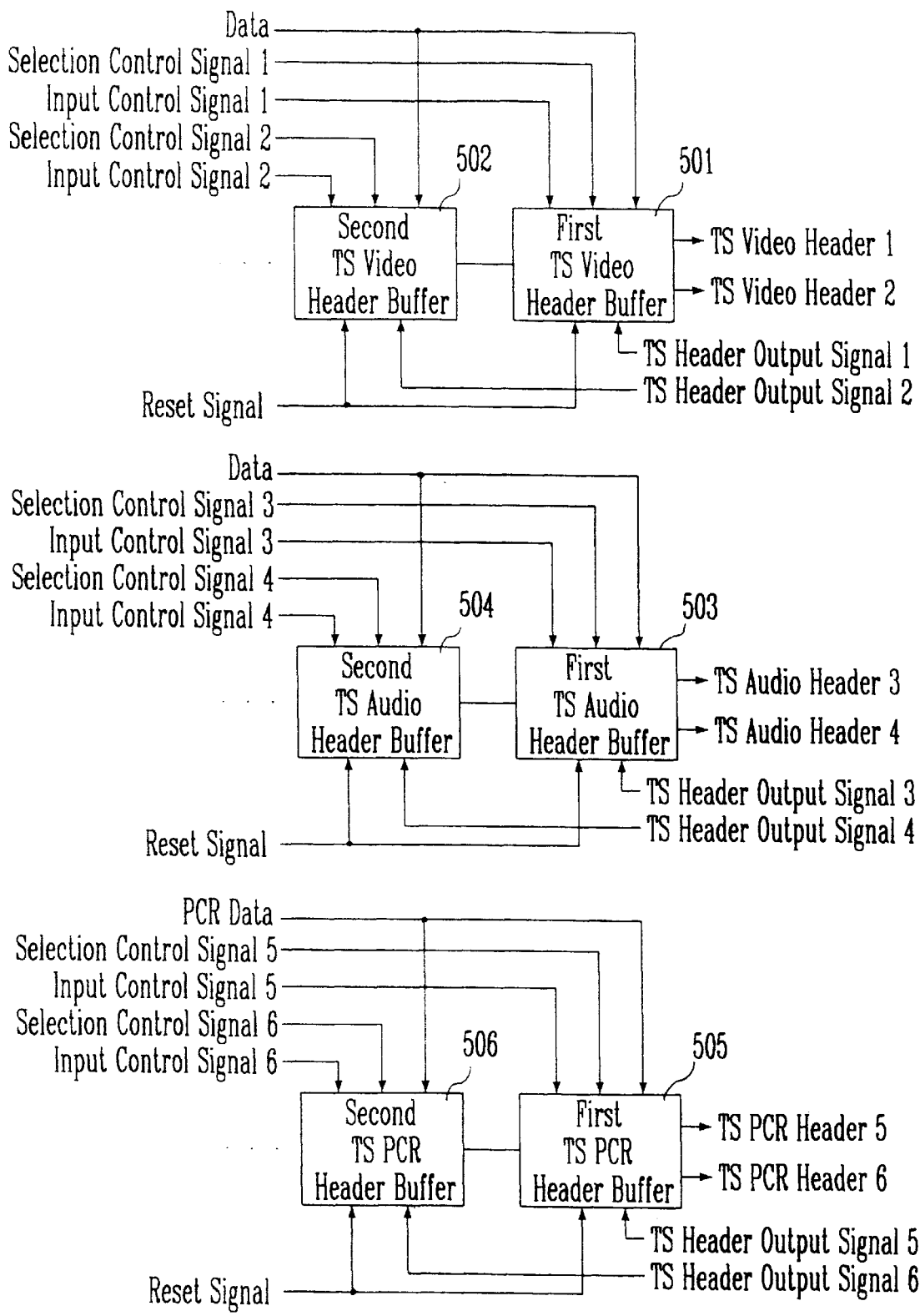
FIG. 5 illustrates a detailed configuration of a transport stream header processor of FIG. 1.

FIG. 5 shows a detailed configuration of the TS header processor of FIG. 1. In FIG. 5, reference numeral 501 designates a first TS video header buffer, 502 designates a second TS video header buffer, 503 designates a first TS audio header buffer, 504 designates a second TS audio header buffer, 505 designates a first TS PCR header buffer, and 506 designates a second TS PCR header buffer.

The TS header processor 160 operates through a control signal received from the control signal processor 120 and the rest signal and clock signal inputted from the external.

The first TS video header buffer 501 composed of a parallel register of 4 bytes and a multiplexing unit stores the TS video header (4 bytes data) output from the PCI interface processor 110 in response to the control signals TS_CS1 and TS_WR1 received from the control signal processor 120 and outputs the 4 bytes TS video header TS-HD1 to the TS packet multiplexor 170 in response to the TS header output signal HD_RD1 received from the multiplexing controller 140.

The second TS video header buffer 502 processes the TS header of the second video stream and operates in a manner similar to the first TS video header buffer 501. Accordingly, when programs are tied into one, the TS video header buffer can be mapped for each channel added by providing a plurality of video header buffer.

The first TS audio header buffer 503 composed of a parallel register of 4 bytes and a multiplexing unit so that the audio TS header is processed stores the TS audio header (4 bytes data) outputted from the PCI interface processor 110 in response to the control signals TS_CS3 and TS_WR3 received from the control signal processor 120 and outputs the TS audio header TS_HD3 of 4 bytes to the TS header output signal HD_RD3 received from the multiplexng controller 140.

The second audio header buffer 504 processes the TS header of the second audio stream and operates in a manner similar to the first TS audio header buffer 503. Accordingly, when programs are tied into one, the TS audio header buffer can be mapped for each channel added by providing a plurality of audio header buffer.

The first TS PCR header buffer 505 composed of a parallel register of 6 bytes and a multiplexing unit stores a 4 byte header and a 2 byte control field, provides timing information on the media stream, stores the TS PCR header (6 byte data) outputted from the PCI interface processor 110 in response to the control signals TS_CS5 and TS_WR5 received from the control signal processor 120, and outputs the TS PCR header TS_HD5 of 6 bytes to the TS packet multiplexor 170 in response to the TS header output signal HD_RD5 received from the multiplexing controller 140.

The second TS PCR header buffer 506 processes the TS header of the second PCR stream and operates in a manner similar to the first TS PCR header buffer 505. Accordingly, when programs are tied into one, the TS PCR header buffer can be mapped for each channel added by providing a plurality of PCR header buffer.

As explained hereinbefore, according to a transport stream multiplexing apparatus of the present invention, a plurality of PES stream transmitted from the respective encoders can be multiplexed and drived in only one transport stream multiplexing apparatus per channel by simplifying an interface between the encoders and the transport stream multiplexing apparatus by means of a PCI bus. In addition, real time ATM network matching can be easily accomplished by mapping the header tables whenever channels are added.

The present invention has been described with reference to a particular embodiment in connection with a particular application.

All Those having ordinary skill in the art and access to the teachings of the present inventor will recognize additional modifications and applications are within the scope of the present invention. It is therefore intended by the appended claims to cover any and all such applications, modifications, and embodiments within the scope of the present invention.

What is claimed is:

1. A transport stream (TS) multiplexing apparatus, comprising:

matching means for receiving data signals and control signals for an external source and distinctly outputting said control signals as an address signal and a read/write signals and outputting said data signals;

control signal processing means for receiving said address signal and said read/write signal and outputting a selection signal, an input signal, and a transmission control signal;

buffering means for receiving said data signals, said selection signal, and said input signal, storing said data signals in response to said selection signal and said input signal, and outputting an output request signal;

timing processing means for receiving a reset signal and a clock signal from an external source and generating a timing signal and a program clock reference (PCR) data in response to said reset signal and said clock signal;

multiplexing control means for receiving said output request signal, said clock signal, said reset signal and a set signal from said external source, and said timing signal, processing said output request according to an output schedule, and outputting a payload output signal, a retransmission signal and a TS header output signal;

said buffering means further comprising means for receiving said payload output signal and said retransmission signal and outputting a TS packet and a TS payload in response to said payload output signal and said retransmission signal;

header processing means for receiving said transmission control signal, said TS header output signal, said PCR data and said data signal, processing said data signals and PCR data in response to said transmission control signal and outputting a TS header data in response to said TS header output signal; and packet multiplexing means for receiving and multiplexing said TS header data, said TS packet and said TS payload and outputting said TS packet.

2. The apparatus of claims 1, wherein said control signal output by said matching means further comprise a program map table TS packet and a program combining table TS packet and said buffering means comprises:

a plurality of video buffering means for receiving said payload output signal, said selection signal, said input signal, and said data signals, storing said data signals in response to said selection signal and said input signal, transmitting an output request signal to said multiplexing control means, and outputting a video TS payload to said multiplexing control means in response to said payload output signal;

a plurality of audio buffering means for receiving said payload output signal, said selection signal, said input signal, and said data signals, storing said data signals in response to said selection signal and said input signal, transmitting an output request signal to said multiplexing control means and outputting an audio TS payload to said multiplexing control means in response to said payload output signal;

program map buffering means for receiving said program map table TS packet, said selection signal, said input signal, said retransmission signal, and said payload output signal, storing said program map table TS packet in response to said selection signal and input signal, determining a retransmission mode in response to said retransmission signal, and transmitting said program map table TS packet to said multiplexing means in response to said payload output signal; and program combining table buffering means for receiving said program combining table buffering TS packet, said input signal, said selection signal, said retransmission signal, and said payload output signal, storing said program combining table TS packet in response to said selection signal and said input signal, determining a retransmission mode in response to said retransmission signal, and transmitting the program combining table TS packet to said multiplexing control means.

3. The apparatus of claim 1, wherein said multiplexing control means comprises:

counting means for receiving said set signal, said reset signal, said clock signal, and a counter end signal, starting internal counting in response to said set signal, said reset signal and said clock signal, and periodically outputting a counter value in response to said counter end signal;

output arbitration means for receiving said clock signal, an output arbitration control signal, said timing signal, and plural ones of said output request signal, initializing output arbitration in response to said clock signal and said output arbitration control signal, and generating a TS packet enable signal in response to said plural ones of said output request signal; and output signal generating means for receiving said counter value and said TS packet enable signal, outputting said counter end signal when a limited counter area is finished, outputting said output arbitration control signal, outputting said TS header output signal corresponding to said TS packet enable signal, and outputting said retransmission signal to said buffering means for outputting said said TS packet to said packet multiplexing means from said buffering means.

4. The apparatus of claim 1, wherein said timing processing means comprises:

extension field counting means for receiving said clock signal and said reset signal, and outputting another clock signal and a first counter value in response thereto;

basic field counting means for receiving said clock signal, said reset signal, and said another clock signal and outputting a second counter value in response to said clock signal, said reset signal, and said another clock signal;

payload combining means for receiving said first counter value and said second counter value, adding a stepping bit between said first counter value and said second counter value, and outputting said PCR data; and packet timing means for receiving said clock signal, said reset signal and said another clock signal and outputting said timing signal.

5. The apparatus of claim 1, wherein said matching means comprise means for outputting a TS video header, a TS audio header, and a TS PCR header, said header processing means further comprising:

a plurality of video buffering means for receiving said TS video header, said transmission control signal, and said TS header output signal, storing said TS video header in response to said transmission control signal, and outputting said TS video header to said multiplexing control means in response to said TS header output signal;

a plurality of audio buffering means for receiving said TS audio header, said transmission control signal, and said TS header output signal, storing said TS audio header in response to said transmission control signal, and outputting said TS audio header to said multiplexing control means in response to said TS header output signal; and a plurality of PCR buffering means for receiving said TS PCR header, said transmission control signal, and said TS header output signal, storing said TS PCR header in response to said transmission control signal, and outputting said TS PCR header to said multiplexing control means in response to said TS header output signal.

* * * * *